United States Patent
Moniruzzaman

(10) Patent No.: US 9,260,565 B2
(45) Date of Patent: Feb. 16, 2016

(54) HIGH STRENGTH HIGH IMPACT HIGH FLOW OSU COMPLIANT POLYETHERIMIDE-CARBON FIBER COMPOSITES

(75) Inventor: Mohammad Moniruzzaman, Exton, PA (US)

(73) Assignee: SABIC Global Technologies B.V., Bergen op Zoom (NL)

(*) Notice: Subject to any disclaimer, the term of this patent is extended or adjusted under 35 U.S.C. 154(b) by 731 days.

(21) Appl. No.: 13/545,730

(22) Filed: Jul. 10, 2012

(65) Prior Publication Data

US 2014/0018491 A1 Jan. 16, 2014

(51) Int. Cl.
*C08K 3/04* (2006.01)
*C08L 83/04* (2006.01)
*C08K 7/14* (2006.01)
*C08G 73/10* (2006.01)
*C08J 5/04* (2006.01)
*C08K 7/06* (2006.01)
*C08L 71/00* (2006.01)
*C08L 79/08* (2006.01)
*C08L 83/10* (2006.01)
*C08G 77/455* (2006.01)

(52) U.S. Cl.
CPC ........ *C08G 73/1046* (2013.01); *C08G 73/106* (2013.01); *C08G 73/1042* (2013.01); *C08J 5/042* (2013.01); *C08K 7/06* (2013.01); *C08L 71/00* (2013.01); *C08L 79/08* (2013.01); *C08L 83/10* (2013.01); *C08G 77/455* (2013.01)

(58) Field of Classification Search
USPC ........................................ 524/495
See application file for complete search history.

(56) References Cited

U.S. PATENT DOCUMENTS

| | | | |
|---|---|---|---|
| 3,972,902 A | 8/1976 | Heath et al. | |
| 3,976,729 A | 8/1976 | Lewis et al. | |
| 4,005,183 A * | 1/1977 | Singer | 423/447.2 |
| 4,026,788 A | 5/1977 | McHenry | |
| 4,394,475 A * | 7/1983 | Temple et al. | 524/262 |
| 4,404,350 A | 9/1983 | Ryang | |
| 4,455,410 A | 6/1984 | Giles, Jr. | |
| 4,548,997 A | 10/1985 | Mellinger et al. | |
| 4,629,759 A | 12/1986 | Rock | |
| 4,629,997 A | 12/1986 | Kuo | |
| 4,690,997 A | 9/1987 | Cella et al. | |
| 4,808,686 A | 2/1989 | Cella et al. | |
| 4,816,527 A | 3/1989 | Rock | |
| 5,223,556 A | 6/1993 | Gotoh et al. | |
| 6,310,145 B1 | 10/2001 | Puyenbroek et al. | |
| 7,230,066 B2 | 6/2007 | Khouri et al. | |
| 8,017,699 B1 | 9/2011 | Sanner et al. | |

FOREIGN PATENT DOCUMENTS

| | | |
|---|---|---|
| EP | 0111327 | 6/1984 |
| WO | WO 2012/054595 | 4/2012 |
| WO | WO 2012/068259 | 5/2012 |

OTHER PUBLICATIONS

T. Matsumoto, "Mesophase Pitch and Its Carbon Fibers", Pure & Appl. Chem., 1985, vol. 57, No. 11, pp. 1553-1562.

* cited by examiner

*Primary Examiner* — Ling Choi
*Assistant Examiner* — Thuy-Ai Nguyen
(74) *Attorney, Agent, or Firm* — Baker Hostetler LLP

(57) ABSTRACT

Disclosed herein are fiber reinforced thermoplastic composite with desired physical properties, such as high strength, high impact and high flow while maintaining the OSU heat release compliancy.

11 Claims, No Drawings

US 9,260,565 B2

HIGH STRENGTH HIGH IMPACT HIGH FLOW OSU COMPLIANT POLYETHERIMIDE-CARBON FIBER COMPOSITES

FIELD OF INVENTION

The present invention relates to fiber reinforced thermoplastic composites, and methods of making same, wherein the fiber reinforced thermoplastic composites comprise a continuous thermoplastic polymer phase and a disperse phase comprising a plurality of carbon fibers dispersed in the continuous thermoplastic polymer phase, and the continuous thermoplastic polymer phase comprising a thermoplastic resin, a flow modifier, and a polyetherimide-siloxane copolymer.

BACKGROUND

Metal replacement with lightweight materials is a major focus of the airline industry to achieve fuel economy. Carbon fiber reinforced thermoplastic composites are attractive candidates for load bearing parts in the aircrafts as the carbon fiber can significantly improve the mechanical properties of the thermoplastic resin used in the composite. A high loading of the carbon fibers in the thermoplastics is necessary to meet the stiffness and strength requirements of the load bearing parts where aluminum or other metals are currently being used. However, the high loading of carbon fibers causes a significant increase in melt viscosity of the composites that creates processing difficulties.

Polyetherimides are amorphous thermoplastic resins that have found applications in thermoplastic composites used in the aircraft industries due to their high glass transition temperatures, high heat resistance, good mechanical properties, low warpage and inherent flame retardant properties. The melt flow rate of polyetherimide composites are significantly lower compared to semicrystalline thermoplastic resin composites, e.g. polyphenylene sulfide, polyetheretherketone and the like, which prevents their use in large size load bearing parts, e.g. in aircraft seat back frames. There remain certain applications wherein an increased melt flow rate of polyetherimide composites than is currently available would be desirable. Low molecular weight polyetherimides offer higher flow but at the expense of other properties, e.g. impact strength.

In addition to processing requirements, a thermoplastic resin used in aircraft industries must also pass specified flammability tests that include a vertical Bunsen burner test, a heat release test and a smoke test. Historically, the heat release test, which is also known as the OSU (Ohio State University) test, is the most difficult test to pass with the thermoplastics. Thus, the challenge in developing thermoplastic composites lies in the manipulation of the thermoplastic composites to achieve a combination of good mechanical properties (e.g. high strength, high impact) and high flow while maintaining the OSU heat release compliancy.

Accordingly, there is a need for high flow polyetherimide composites, devices thereof and methods thereof that comprise carbon fiber, wherein the polyetherimide composites have high strength, e.g. strength that is similar or greater than that of die-cast aluminum, high impact; and are compliant with the OSU 65/65 heat-release parameters. Such thermoplastic composites, devices comprising thermoplastic composites, and methods related thereto are described herein.

SUMMARY

In accordance with the purpose(s) of the present invention, as embodied and broadly described herein, the invention, in one aspect, relates to fiber reinforced thermoplastic composites comprising a continuous thermoplastic polymer phase and a dispersed phase comprising a plurality of carbon fibers dispersed in the continuous thermoplastic polymer phase, and to methods of preparing the fiber reinforced thermoplastic composites. In a further aspect, the fiber reinforced thermoplastic composites have high strength, high impact, high flow and are compliant with the OSU 65/65 standard, i.e. the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test. In a still further aspect, the present invention relates to articles of manufacturer comprising the fiber reinforced thermoplastic composites.

Disclosed herein are fiber reinforced thermoplastic composites, comprising: a) a continuous thermoplastic polymer phase comprising: i) a thermoplastic resin having a molecular weight of less than or equal to about 40,000 Daltons; ii) a flow modifier; and iii) a polyetherimide-siloxane copolymer; and b) a dispersed phase comprising a plurality of carbon fibers having a tensile strength in the range of from about 500 to about 1,200 kilo-pounds per square inch ("KSI") dispersed within the continuous thermoplastic polymer phase; wherein the composite exhibits a tensile strength of at least about 240 MPa; wherein the composite exhibits a notched Izod impact strength of at least about 75 J/m; wherein the composite exhibits an unnotched Izod impact strength of at least about 500 J/m; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

Also disclosed herein are fiber reinforced thermoplastic composites, comprising a continuous thermoplastic polymer phase comprising: a) a polyetherimide having a molecular weight of less than or equal to about 40,000 Daltons; a polyetheretherketone having a melt viscosity less than about 150 Pascal-seconds (Pa-s) when determined under the conditions of 400° C. and a shear rate of 1000/s; and a polyetherimide-siloxane copolymer; and b) a dispersed phase comprising a plurality of carbon fibers having a tensile strength in the range of from about 500 to about 1,200 kilo-pounds per square inch ("KSI") dispersed within the continuous thermoplastic polymer phase; and wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; and wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

Also disclosed herein are fiber reinforced thermoplastic composites, comprising: a) a continuous thermoplastic polymer phase comprising: i) a polyetherimide having a molecular weight of less than or equal to about 40,000 Daltons, wherein the polyetherimide resin is present in the composite in an amount that does not exceed about 70 wt % of the composite; ii) a polyetheretherketone having a melt viscosity less than about 150 Pascal-seconds (Pa-s) when determined under the conditions of 400° C. and a shear rate of 1000/s, wherein the polyetheretherketone is present in the composite in an amount in the range of from about 10 wt % to about 40 wt % of the continuous thermoplastic polymer phase; and iii)

a polyetherimide-siloxane copolymer, wherein the polyetherimide-siloxane copolymer is present in an amount of at least about 1 wt % of the composite; and b) a dispersed phase comprising a plurality of carbon fibers having a tensile strength in the range of from about 500 to about 1,200 kilo-pounds per square inch ("KSI") dispersed within the continuous thermoplastic polymer phase, wherein the plurality of carbon fibers are present in an amount that is at least about 20 wt % of the total weight of the composite.

Also disclosed are methods for the manufacture of a fiber-reinforced thermoplastic composition, comprising the steps of: a) providing thermoplastic resin composition comprising: i) a thermoplastic resin having a molecular weight of less than or equal to about 40,000 Daltons; ii) a flow modifier; and iii) a polyetherimide-siloxane copolymer; and b) introducing a plurality of carbon fibers having a tensile strength in the range of from about 500 to about 1,200 kilo-pounds per square inch ("KSI") into the thermoplastic resin composition to form a fiber reinforced thermoplastic composite precursor composition; and c) forming a fiber reinforced thermoplastic composite from the precursor composition; and wherein the formed fiber reinforced thermoplastic composite exhibits a tensile strength of at least about 240 MPa; wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

Also disclosed herein are articles of manufacturer comprising the fiber reinforced thermoplastic composites described herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present invention can be described and claimed in a particular statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "fiber reinforced thermoplastic composite" and "composite" are used interchangeably herein.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "polyetherimide," as used herein refers, refers to a polymer containing monomer units which comprise both ether and an imide group. An ether group is well known in the art and consists of an oxygen atom single bonded to two different carbon atoms. An imide group is a nitrogen containing acid having two double bonds.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Fiber Reinforced Thermoplastic Composites

In accordance with the purpose(s) of the present invention, as embodied and broadly described herein, the invention, in one aspect, relates to fiber reinforced thermoplastic composites comprising a continuous thermoplastic polymer phase and a dispersed phase comprising a plurality of carbon fibers dispersed in the continuous thermoplastic polymer phase, and to methods of preparing the fiber reinforced thermoplastic composites. In a further aspect, the fiber reinforced thermoplastic composites have high strength, high impact, high flow and are compliant with the OSU 65/65 standard, i.e. the composite exhibits a heat release profile characterized by a 2 minute total heat release less than about 65 kW min/m$^2$ and a peak heat release rate less than about 65 kW/m$^2$ when measured according to the Ohio State University ("OSU") Heat Release test. In a still further aspect, the present invention relates to articles of manufacturer comprising the fiber reinforced thermoplastic composites.

Disclosed herein are fiber reinforced thermoplastic composites, comprising: a) a continuous thermoplastic polymer phase comprising: i) a thermoplastic resin having a molecular weight of less than or equal to about 40,000 Daltons; ii) a flow modifier; and iii) a polyetherimide-siloxane copolymer; and b) a dispersed phase comprising a plurality of carbon fibers having a tensile strength in the range of from about 500 to about 1,200 kilo-pounds per square inch ("KSI") dispersed within the continuous thermoplastic polymer phase; wherein the composite exhibits a tensile strength of at least about 240 MPa; wherein the composite exhibits a notched Izod impact strength of at least about 75 J/m; wherein the composite exhibits an unnotched Izod impact strength of at least about 500 J/m; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

Also disclosed herein are fiber reinforced thermoplastic composites, comprising a continuous thermoplastic polymer phase comprising: a) a polyetherimide having a molecular weight of at least 40,000 Daltons; a polyetheretherketone having a melt viscosity less than about 150 Pascal-seconds (Pa-s) when determined under the conditions of 400° C. and a shear rate of 1000/s; and a polyetherimide-siloxane copolymer; and b) a dispersed phase comprising a plurality of carbon fibers having a tensile strength in the range of from about 500 to about 1,200 kilo-pounds per square inch ("KSI") dispersed within the continuous thermoplastic polymer phase; and wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

Also disclosed herein are fiber reinforced thermoplastic composites, comprising: a) a continuous thermoplastic polymer phase comprising: i) a polyetherimide having a molecular weight of less than or equal to about 40,000 Daltons, wherein the polyetherimide resin is present in the composite in an amount that does not exceed about 70 wt % of the composite; ii) a polyetheretherketone having a melt viscosity less than about 150 Pascal-seconds (Pa-s) when determined under the conditions of 400° C. and a shear rate of 1000/s, wherein the polyetheretherketone is present in the composite in an amount in the range of from about 10 wt % to about 40 wt % of the continuous thermoplastic polymer phase; and iii) a polyetherimide-siloxane copolymer, wherein the polyetherimide-siloxane copolymer is present in an amount of at least about 1 wt % of the composite; and b) a dispersed phase comprising a plurality of carbon fibers having a tensile strength in the range of from about 500 to about 1,200 kilo-pounds per square inch ("KSI") dispersed within the continuous thermoplastic polymer phase, wherein the plurality of carbon fibers are present in an amount that is at least about 20 wt % of the total weight of the composite.

Also disclosed are methods for the manufacture of a fiber-reinforced thermoplastic composition, comprising the steps of: a) providing thermoplastic resin composition comprising: i) a thermoplastic resin having a molecular weight of less than or equal to about 40,000 Daltons; ii) a flow modifier; and iii) a polyetherimide-siloxane copolymer; and b) introducing a plurality of carbon fibers having a tensile strength in the range of from about 500 to about 1,200 kilo-pounds per square inch ("KSI") into the thermoplastic resin composition to form a fiber reinforced thermoplastic composite precursor composition; and c) forming a fiber reinforced thermoplastic composite from the precursor composition; and wherein the formed fiber reinforced thermoplastic composite exhibits a tensile strength of at least about 240 MPa; wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

In one aspect, the fiber reinforced thermoplastic composite can contain different amounts of the thermoplastic resin, the flow modifier, the polyetherimide-siloxane copolymer, and the carbon fibers. In a further aspect, the polyetheretherketone is not a polyphenylsulfone.

In one aspect, the fiber reinforced thermoplastic composite can comprise a thermoplastic resin present in an amount of about 30 wt %, about 35 wt %, about 40 wt %, about 45 wt %, about 50 wt %, about 55 wt %, about 60 wt %, about 65 wt % or about 70 wt % of the composite. In a further aspect, the fiber reinforced thermoplastic composite can comprise a thermoplastic resin present in an amount of about 40 wt %, about 45 wt %, about 50 wt %, about 55 wt %, or about 60 wt % of the composite. In a further aspect, the fiber reinforced thermoplastic composite can comprise a thermoplastic resin present in an amount of about 50 wt %, about 51 wt %, about 52 wt %, about 53 wt %, about 54 wt %, about 55 wt %, about 56 wt %, about 57 wt %, about 58 wt %, about 59 wt %, or about 60 wt % of the composite. In a still further aspect, the fiber reinforced thermoplastic composite can comprise a thermoplastic resin is present in an amount that does not exceed about 60 wt % of the composite.

In one aspect, the fiber reinforced thermoplastic composite can comprise a thermoplastic resin present in an amount in the range of from about 30 wt % to about 70 wt %, about 30 wt % to about 60 wt %, about 40 wt % to about 60 wt %, and about 50 wt % to about 60 wt % of the composite. In another aspect, the fiber reinforced thermoplastic composite can comprise a thermoplastic resin present in an amount in the range of from about 30 wt % to about 55 wt %, about 40 wt % to about 55 wt %, about 50 wt % to about 55 wt %, and about 55 wt % to about 60 wt % of the composite. For example, the thermoplastic resin is present in an amount in the range of about 40 wt % to about 55 wt % of the composite. In a further aspect, the thermoplastic resin is present in an amount in the range of from about 30 wt % to about 70 wt % of the composite. In a still further aspect, the fiber reinforced thermoplastic composite can comprise a thermoplastic resin present in an amount in the range of from about 40 wt % to about 60 wt % of the composite. In a yet further aspect, the thermoplastic resin is present in an amount in the range of from about 50 wt % to about 60 wt % of the composite.

In one aspect, the fiber reinforced thermoplastic composite comprises a thermoplastic resin present in an amount that exceeds about 30 wt %, about 35 wt %, about 40 wt %, about 45 wt %, about 50 wt %, about 55 wt %, or about 60 wt % of the composite. For example, the fiber reinforced thermoplastic composite comprises a thermoplastic resin present in an amount that exceeds about 40 wt %, about 45 wt %, about 50 wt %, or about 55 wt % of the composite. In a further aspect, the fiber reinforced thermoplastic composite comprises a thermoplastic resin present in an amount that exceeds about 55 wt % of the composite. In a yet further aspect, the fiber reinforced thermoplastic composite comprises a thermoplastic resin present in an amount that exceeds about 50 wt % of the composite. In an even further aspect, the fiber reinforced thermoplastic composite comprises a thermoplastic resin present in an amount that exceeds about 45 wt % of the composite. In a still further aspect, the fiber reinforced thermoplastic composite comprises a thermoplastic resin present in an amount that exceeds about 40 wt % of the composite.

In one aspect, the fiber reinforced thermoplastic composite can comprise a thermoplastic resin, wherein the thermoplastic resin has a weight average molecular weight (Mw) of greater than or equal to about 10,000 Daltons, about 15,000 Daltons, about 20,000 Daltons, about 25,000 Daltons, or about 30,000 Daltons. In a further aspect, the fiber reinforced thermoplastic composite can comprise a thermoplastic resin, wherein the thermoplastic resin has a Mw of greater than or equal to about 15,000 Daltons. In a still further aspect, the fiber reinforced thermoplastic composite can comprise a thermoplastic resin, wherein the thermoplastic resin has a Mw of greater than or equal to about 20,000 Daltons. In a yet further aspect, the fiber reinforced thermoplastic composite can comprise a thermoplastic resin, wherein the thermoplastic resin has a Mw of greater than or equal to about 25,000 Daltons. In an even further aspect, the fiber reinforced thermoplastic composite can comprise a thermoplastic resin, wherein the thermoplastic resin has a Mw of greater than or equal to about 30,000 Daltons. It is understood that the Mw of the thermoplastic resin is as measured by gel permeation chromatography, using a polystyrene standard.

In one aspect, the fiber reinforced thermoplastic composite can comprise a thermoplastic resin, wherein the thermoplastic resin has a Mw less than or equal to about 40,000 Daltons, about 39,000 Daltons, about 38,000 Daltons, about 37,000 Daltons, about 36,000 Daltons, about 35,000 Daltons, about 34,000 Daltons, about 33,000 Daltons, about 32,000 Daltons, about 31,000 Daltons, or about 30,000 Daltons. In a further aspect, the fiber reinforced thermoplastic composite can comprise a thermoplastic resin, wherein the thermoplastic resin has a Mw less than or equal to about 40,000 Daltons. In a further aspect, the fiber reinforced thermoplastic composite can comprise a thermoplastic resin, wherein the thermoplastic resin has a Mw less than or equal to about 39,000 Daltons. In a still further aspect, the fiber reinforced thermoplastic composite can comprise a thermoplastic resin, wherein the thermoplastic resin has a Mw less than or equal to about 35,000 Daltons.

In one aspect, the fiber reinforced thermoplastic composite can comprise a thermoplastic resin, wherein the thermoplastic resin has a Mw from about 10,000 Daltons to about 40,000 Daltons, from about 15,000 Daltons to about 40,000 Daltons, from about 17,000 Daltons to about 40,000 Daltons, from about 19,000 Daltons to about 40,000 Daltons, from about 20,000 Daltons to about 40,000 Daltons, from about 21,000 Daltons to about 40,000 Daltons, from about 22,000 Daltons to about 40,000 Daltons, from about 23,000 Daltons to about 40,000 Daltons, from about 24,000 Daltons to about 40,000 Daltons, or from about 25,000 Daltons to about 40,000 Daltons. In a further aspect, the fiber reinforced thermoplastic composite can comprise a thermoplastic resin, wherein the thermoplastic resin has a Mw from about 10,000 Daltons to about 39,000 Daltons, from about 15,000 Daltons to about 39,000 Daltons, from about 17,000 Daltons to about 39,000 Daltons, from about 19,000 Daltons to about 39,000 Daltons, from about 20,000 Daltons to about 39,000 Daltons, from about 21,000 Daltons to about 39,000 Daltons, from about 22,000 Daltons to about 39,000 Daltons, from about 23,000 Daltons to about 39,000 Daltons, from about 24,000 Daltons to about 39,000 Daltons, or from about 25,000 Daltons to about 39,000 Daltons. In a still further aspect, the fiber reinforced thermoplastic composite can comprise a thermoplastic resin, wherein the thermoplastic resin has a Mw from about 10,000 Daltons to about 35,000 Daltons, from about 15,000 Daltons to about 35,000 Daltons, from about 17,000 Daltons to about 35,000 Daltons, from about 19,000 Daltons to about 35,000 Daltons, from about 20,000 Daltons to about 35,000 Daltons, from about 21,000 Daltons to about 35,000 Daltons, from about 22,000 Daltons to about 35,000 Daltons, from about 23,000 Daltons to about 35,000 Daltons, from about 24,000 Daltons to about 35,000 Daltons, or from about 25,000 Daltons to about 35,000 Daltons. In a yet further aspect, the fiber reinforced thermoplastic composite can comprise a thermoplastic resin, wherein the thermoplastic resin has a Mw from about 15,000 Daltons to about 40,000 Daltons. In an even further aspect, the fiber reinforced thermoplastic composite can comprise a thermoplastic resin, wherein the thermoplastic resin has a Mw from about 15,000 Daltons to about 39,000 Daltons. In a still further aspect, the fiber reinforced thermoplastic composite can comprise a thermoplastic resin, wherein the thermoplastic resin has a Mw from about 20,000 Daltons to about 35,000 Daltons. In a yet further aspect, the fiber reinforced thermoplastic composite can comprise a thermoplastic resin, wherein the thermoplastic resin has a Mw from about 25,000 Daltons to about 35,000 Daltons.

In one aspect, the fiber reinforced thermoplastic composite can comprise a thermoplastic resin, wherein the thermoplastic resin is a polyetherimide and is present in an amount of about 30 wt %, about 35 wt %, about 40 wt %, about 45 wt %, about 50 wt %, about 55 wt %, about 60 wt %, about 65 wt % or about 70 wt % of the composite. In a further aspect, the fiber reinforced thermoplastic composite can comprise a thermoplastic resin, wherein the thermoplastic resin is a polyetherimide and is present in an amount of about 40 wt %, about 45 wt %, about 50 wt %, about 55 wt %, or about 60 wt % of the composite. In a further aspect, the fiber reinforced thermoplastic composite can comprise a thermoplastic resin, wherein the thermoplastic resin is a polyetherimide and is present in an amount of about 50 wt %, about 51 wt %, about 52 wt %, about 53 wt %, about 54 wt %, about 55 wt %, about 56 wt %, about 57 wt %, about 58 wt %, about 59 wt %, or about 60 wt % of the composite. In a still further aspect, the fiber reinforced thermoplastic composite can comprise a thermoplastic resin, wherein the thermoplastic resin is a polyetherimide and is present an amount that does not exceed about 60 wt % of the composite.

In one aspect, the fiber reinforced thermoplastic composite can comprise a thermoplastic resin, wherein the thermoplastic resin is a polyetherimide and is present in an amount in the range of from about 30 wt % to about 70 wt %, about 30 wt % to about 60 wt %, about 40 wt %.to about 60 wt %, and about 50 wt % to about 60 wt % of the composite. In another aspect, the fiber reinforced thermoplastic composite can comprise a thermoplastic resin, wherein the thermoplastic resin is a polyetherimide and is present in an amount in the range of from about 30 wt % to about 55 wt %, about 40 wt % to about 55 wt %, about 50 wt % to about 55 wt %, and about 55 wt % to about 60 wt % of the composite. For example, the fiber reinforced thermoplastic composite can comprise a thermoplastic resin, wherein the thermoplastic resins is a polyetherimide and is present in an amount in the range of about 40 wt % to about 55 wt % of the composite. In a further aspect, the fiber reinforced thermoplastic composite can comprise a thermoplastic resin, wherein the thermoplastic resin is a polyetherimide and is present in an amount in the range of from about 30 wt % to about 70 wt % of the composite. In a still further aspect, the fiber reinforced thermoplastic composite can comprise a thermoplastic resin, wherein the thermoplastic resin is a polyetherimide and is present in an amount in the range of from about 40 wt % to about 60 wt % of the composite. In a yet further aspect, the fiber reinforced thermoplastic composite can comprise a thermoplastic resin, wherein the thermoplastic resin is a polyetherimide and is present in an amount in the range of from about 50 wt % to about 60 wt % of the composite.

In one aspect, the fiber reinforced thermoplastic composite can comprise a thermoplastic resin, wherein thermoplastic resin is a polyetherimide and is present in an amount that exceeds about 30 wt %, about 35 wt %, about 40 wt %, about 45 wt %, about 50 wt %, about 55 wt %, or about 60 wt % of the composite. For example, the fiber reinforced thermoplastic composite can comprise a thermoplastic resin, wherein the thermoplastic resin is a polyetherimide and is present in an amount that exceeds about 40 wt %, about 45 wt %, about 50 wt %, or about 55 wt % of the composite. In a further aspect, the fiber reinforced thermoplastic composite can comprise a thermoplastic resin, wherein the thermoplastic resin is a polyetherimide and is present in an amount that exceeds about 55 wt % of the composite. In a yet further aspect, the fiber reinforced thermoplastic composite comprises the thermoplastic resin is a polyetherimide and is present in an amount that exceeds about 50 wt % of the composite. In an even further aspect, the fiber reinforced thermoplastic composite can comprise a thermoplastic resin, wherein the thermoplastic resin is a polyetherimide and is present in an amount that exceeds about 45 wt % of the composite. In a still further aspect, the fiber reinforced thermoplastic composite can comprise a thermoplastic resin, wherein the thermoplastic resin is a polyetherimide and is present in an amount that exceeds about 40 wt % of the composite.

In one aspect, the fiber reinforced thermoplastic composite can comprise a thermoplastic resin, wherein the thermoplastic resin is a polyetherimide and has a Mw of greater than or equal to about 10,000 Daltons, about 15,000 Daltons, about 20,000 Daltons, about 25,000 Daltons, or about 30,000 Daltons. In a further aspect, the fiber reinforced thermoplastic composite can comprise a thermoplastic resin, wherein the thermoplastic resin is a polyetherimide and has a Mw of greater than or equal to about 15,000 Daltons. In a still further aspect, the fiber reinforced thermoplastic composite can comprise a thermoplastic resin, wherein the thermoplastic resin is a polyetherimide and has a Mw of greater than or equal to about 20,000 Daltons. In a yet further aspect, the fiber reinforced thermoplastic composite can comprise a thermoplastic resin, wherein the thermoplastic resin is a polyetherimide and has a Mw of greater than or equal to about 25,000 Daltons. In an even further aspect, the fiber reinforced thermoplastic composite can comprise a thermoplastic resin, wherein the thermoplastic resin is a polyetherimide and has a Mw of greater than or equal to about 30,000 Daltons. It is understood that the Mw of the polyetherimide is as measured by gel permeation chromatography, using a polystyrene standard.

In one aspect, the fiber reinforced thermoplastic composite can comprise a thermoplastic resin, wherein the thermoplastic resin is a polyetherimide and has a Mw less than or equal to about 40,000 Daltons, about 39,000 Daltons, about 38,000 Daltons, about 37,000 Daltons, about 36,000 Daltons, about 35,000 Daltons, about 34,000 Daltons, about 33,000 Daltons, about 32,000 Daltons, about 31,000 Daltons, or about 30,000 Daltons. In a further aspect, the fiber reinforced thermoplastic composite can comprise a thermoplastic resin, wherein the thermoplastic resin is a polyetherimide and has a Mw less than or equal to about 40,000 Daltons. In a further aspect, the fiber reinforced thermoplastic composite can comprise a thermoplastic resin, wherein the thermoplastic resin is a polyetherimide and has a Mw less than or equal to about 39,000 Daltons. In a still further aspect, the fiber reinforced thermoplastic composite can comprise a thermoplastic resin, wherein the thermoplastic resin is a polyetherimide and has a Mw less than or equal to about 35,000 Daltons.

In one aspect, the fiber reinforced thermoplastic composite can comprise a thermoplastic resin, wherein the thermoplastic resin is a polyetherimide and has a Mw from about 10,000 Daltons to about 40,000 Daltons, from about 15,000 Daltons to about 40,000 Daltons, from about 17,000 Daltons to about 40,000 Daltons, from about 19,000 Daltons to about 40,000 Daltons, from about 20,000 Daltons to about 40,000 Daltons, from about 21,000 Daltons to about 40,000 Daltons, from about 22,000 Daltons to about 40,000 Daltons, from about 23,000 Daltons to about 40,000 Daltons, from about 24,000 Daltons to about 40,000 Daltons, or from about 25,000 Daltons to about 40,000 Daltons. In a further aspect, the fiber reinforced thermoplastic composite can comprise a thermoplastic resin, wherein the thermoplastic resin is a polyetherimide and has a Mw from about 10,000 Daltons to about 39,000 Daltons, from about 15,000 Daltons to about 39,000 Daltons, from about 17,000 Daltons to about 39,000 Daltons, from about 19,000 Daltons to about 39,000 Daltons, from about 20,000 Daltons to about 39,000 Daltons, from about 21,000 Daltons to about 39,000 Daltons, from about 22,000 Daltons to about 39,000 Daltons, from about 23,000 Daltons to about 39,000 Daltons, from about 24,000 Daltons to about 39,000 Daltons, or from about 25,000 Daltons to about 39,000 Daltons. In a still further aspect, the fiber reinforced thermoplastic composite can comprise a thermoplastic resin, wherein the thermoplastic resin is a polyetherimide and has a Mw from about 10,000 Daltons to about 35,000 Daltons, from about 15,000 Daltons to about 35,000 Daltons, from about 17,000 Daltons to about 35,000 Daltons, from about 19,000 Daltons to about 35,000 Daltons, from about 20,000 Daltons to about 35,000 Daltons, from about 21,000 Daltons to about 35,000 Daltons, from about 22,000 Daltons to about 35,000 Daltons, from about 23,000 Daltons to about 35,000 Daltons, from about 24,000 Daltons to about 35,000 Daltons, or from about 25,000 Daltons to about 35,000 Daltons. In a yet further aspect, the fiber reinforced thermoplastic composite can comprise a thermoplastic resin, wherein the thermoplastic resin is a polyetherimide and has a Mw from about 15,000 Daltons to about 40,000 Daltons. In an even further aspect, the fiber reinforced thermoplastic composite can comprise a thermoplastic resin, wherein the thermoplastic resin is a polyetherimide and has a Mw from about 15,000 Daltons to about 39,000 Daltons. In a still further aspect, the fiber reinforced thermoplastic composite can comprise a thermoplastic resin, wherein the thermoplastic resin is a polyetherimide and has a Mw from about 20,000 Daltons to about 35,000 Daltons. In a yet further aspect, the fiber reinforced thermoplastic composite can comprise a thermoplastic resin, wherein the thermoplastic resin is a polyetherimide and has a Mw from about 25,000 Daltons to about 35,000 Daltons.

In one aspect, the fiber reinforced thermoplastic composite can comprise a flow modifier present in an amount of about 10 wt %, about 15 wt %, about 20 wt %, about 25 wt %, about 30 wt %, about 35 wt %, or about 40 wt % of the continuous thermoplastic polymer phase. In a further aspect, the fiber reinforced thermoplastic composite can comprise a flow modifier present in an amount of about 15 wt %, about 20 wt %, about 25 wt %, about 30 wt %, about 35 wt %, or about 40 wt % of the continuous thermoplastic polymer phase. In a still further aspect, the fiber reinforced thermoplastic composite comprises a flow modifier present in an amount of about 35 wt % of the continuous thermoplastic polymer phase. In a yet further aspect, the fiber reinforced thermoplastic composite comprises a flow modifier present in an amount between about 10 wt % to about 40 wt %, about 20 wt % to about 40 wt %, about 20 wt % to about 30 wt %, or about 10 wt % to about 30 wt % of the continuous thermoplastic polymer phase. In a still further aspect, the fiber reinforced thermoplastic composite comprises a flow modifier present in an amount between about 10 wt % to about 40 wt % of the continuous thermoplastic polymer phase. In a yet further aspect, the fiber reinforced thermoplastic composite comprises a flow modifier present in an amount between about 20 wt % to about 40 wt % of the continuous thermoplastic polymer phase. In an even further aspect, the fiber reinforced thermoplastic composite comprises a flow modifier present in an amount between about 20 wt % to about 30 wt % of the continuous thermoplastic polymer phase. In a still further aspect, the fiber reinforced thermoplastic composite comprises a flow modifier present in an amount between about 10 wt % to about 40 wt % or about 20 wt % to about 40 wt % of the continuous thermoplastic polymer phase.

In one aspect, the fiber reinforced thermoplastic composite can comprise a polyetherimide-siloxane copolymer present in an amount of at least about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.2 wt %, about 2.4 wt %, about 2.6 wt %, about 2.8 wt %, about 3.0 wt %, about 3.5 wt %, about 4.0 wt %, about 5.0 wt %, about 5.5 wt %, about 6.0 wt %, about 7.0 wt %, about 8.0 wt %, about 9.0 wt %, about 10.0 wt %, about 11.0 wt %, about 12.0 wt %, about 13.0 wt %, or about 14.0 wt %. In a further aspect, the fiber reinforced thermoplastic composite can comprise a polyetherimide-siloxane copolymer present in an amount of at least about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.2 wt %, about 2.4 wt %, about 2.6 wt %, about 2.8 wt %, or about 3.0 wt %. In a still further aspect, the fiber reinforced thermoplastic composite can comprise a polyetherimide-siloxane copolymer present in an amount of at least about 1.0 wt %. In a still further aspect, the fiber reinforced thermoplastic composite can comprise a polyetherimide-siloxane copolymer present in an amount of at least about 2.0 wt %. In a still further aspect, the fiber reinforced thermoplastic composite can comprise a polyetherimide-siloxane copolymer present in an amount of at least about 3.0 wt %.

In a further aspect, the fiber reinforced thermoplastic composite can comprise a polyetherimide-siloxane copolymer present in an amount from about 1 wt % to about 15 wt %, from about 1 wt % to about 14 wt %, from about 1 wt % to about 13 wt %, from about 1 wt % to about 12 wt %, from about 1 wt % to about 11 wt %, from about 1 wt % to about 10 wt %, from about 1 wt % to about 9 wt %, from about 1 wt % to about 8 wt %, from about 1 wt % to about 7 wt %, from about 1 wt % to about 6 wt %, from about 1 wt % to about 5 wt %, from about 2 wt % to about 15 wt %, from about 2 wt % to about 14 wt %, from about 2 wt % to about 13 wt %, from about 2 wt % to about 12 wt %, from about 2 wt % to about 11 wt %, from about 2 wt % to about 10 wt %, from about 2 wt % to about 9 wt %, from about 2 wt % to about 8 wt %, from about 2 wt % to about 7 wt %, from about 2 wt % to about 6 wt %, from about 2 wt % to about 5 wt %, from about 3 wt % to about 15 wt %, from about 3 wt % to about 14 wt %, from about 3 wt % to about 13 wt %, from about 3 wt % to about 12 wt %, from about 3 wt % to about 11 wt %, from about 3 wt % to about 10 wt %, from about 3 wt % to about 9 wt %, from about 3 wt % to about 8 wt %, from about 3 wt % to about 7 wt %, from about 3 wt % to about 6 wt %, or from about 3 wt % to about 5 wt %. In a still further aspect, the fiber reinforced thermoplastic composite can comprise a polyetherimide-siloxane copolymer present in an amount from about 1 wt % to about 15 wt %, from about 2 wt % to about 8 wt %, or from about 3 wt % to about 5 wt %. In a yet further aspect, the fiber reinforced thermoplastic composite can comprise a polyetherimide-siloxane copolymer present in an amount from about 1 wt % to about 15 wt %. In an even further aspect, the fiber reinforced thermoplastic composite can comprise a polyetherimide-siloxane copolymer present in an amount from about 2 wt % to about 8 wt %. In a still further aspect, the fiber reinforced thermoplastic composite can comprise a polyetherimide-siloxane copolymer present in an amount from about 3 wt % to about 5 wt %.

In one aspect, the fiber reinforced thermoplastic composite comprises carbon fibers, such as a plurality of carbon fibers. In a further aspect, the carbon fibers are chopped carbon fibers. In a still further aspect, the carbon fibers are present in an amount that is at least about 20 wt %, about 25 wt %, about 30 wt %, about 35 wt %, about 40 wt %, about 45 wt %, about 50 wt %, about 55 wt %, about 60 wt %, about 65 wt %, or about 70 wt % of the total weight of the composite. In a yet further aspect, the carbon fibers are present in an amount of about 20 wt %, about 25 wt %, about 30 wt %, about 35 wt %, about 40 wt %, about 45 wt %, or about 50 wt % of the total weight of the composite. In an even further aspect, the carbon fibers can be present in an amount that is about 20 wt % to about 70% of the total weight of the composite. In a still further aspect, the carbon fibers can be present in an amount that is about 20 wt % to about 50% of the total weight of the composite. In a yet further aspect, the carbon fibers can be present in an amount that is about 30 wt % to about 40% of the total weight of the composite. In an even further aspect, the carbon fibers can be present in an amount that is about 35 wt % to about 55% of the total weight of the composite. In a still further aspect, the carbon fibers can be present in an amount that is about 35 wt % to about 50% of the total weight of the composite. In a yet further aspect, the carbon fibers can be present in an amount that is about 35 wt % to about 45% of the total weight of the composite.

In one aspect, the composite exhibits a tensile strength of at least about 240 MPa, about 245 MPa, about 250 MPa, about 255 MPa, about 260 MPa, about 265 MPa, about 270 MPa, about 275 MPa, about 280 MPa, about 285 MPa, about 290 MPa, about 300 MPa, about 310 MPa, about 320 MPa, about 330 MPa, about 340 MPa, about 350 MPa, about 360 MPa, about 370 MPa, about 380 MPa, about 390 MPa, about 400 MPa, about 420 MPa, about 440 MPa, about 460 MPa, about 480 MPa, or about 500 MPa. In a still further aspect, the composite exhibits a tensile strength of at least about 240 MPa. In a yet further aspect, the composite exhibits a tensile strength of at least about 250 MPa. In an even further aspect, the composite exhibits a tensile strength of at least about 260 MPa. In a still further aspect, the composite exhibits a tensile strength of at least about 270 MPa. In a yet further aspect, the composite exhibits a tensile strength of at least about 280 MPa. In an even further aspect, the composite exhibits a tensile strength of at least about 290 MPa. In a yet further aspect, the composite exhibits a tensile strength of at least about 300 MPa. It is understood that tensile strength of the disclosed composites is measured in accordance with ASTM D-638 on 3.2 mm thick molded tensile bars at a test speed of 5 mm/min and is the strength at break.

In one aspect, the fiber reinforced thermoplastic composite exhibits a notched Izod impact strength of at least about 70 J/m, about 75 J/m, about 80 J/m, about 85 J/m, about 90 J/m, about 95 J/m, or about 100 J/m. In a further aspect, the fiber reinforced thermoplastic composite exhibits a notched Izod impact strength of at least about 80 J/m, about 81 J/m, about 82 J/m, about 83 J/m, about 84 J/m, about 85 J/m, about 86 J/m, about 87 J/m, about 88 J/m, about 89 J/m, or about 90 J/m. In a yet further aspect, the fiber reinforced thermoplastic composite can exhibit a notched Izod impact strength of at least about 70 J/m. In a still further aspect, the fiber reinforced thermoplastic composite can exhibit a notched Izod impact strength of at least about 75 J/m. In a yet further aspect, the fiber reinforced thermoplastic composite can exhibit a notched Izod impact strength of at least about 80 J/m. In an even further aspect, the fiber reinforced thermoplastic composite can exhibit a notched Izod impact strength of at least about 85 J/m. In an even further aspect, the fiber reinforced thermoplastic composite can exhibit a notched Izod impact strength of at least about 90 J/m. It is understood that notched Izod impact strength ("NII") of the disclosed composites is measured in accordance with ASTM D-256 on 3.2 mm thick, molded Izod notched impact (INI) bars at 23° C.

In one aspect, the fiber reinforced thermoplastic composite exhibits a notched Izod impact strength of about 70 J/m to about 200 J/m, 70 J/m to about 175 J/m, 70 J/m to about 150 J/m, 70 J/m to about 125 J/m, 70 J/m to about 100 J/m, 80 J/m to about 200 J/m, 80 J/m to about 175 J/m, 80 J/m to about 150 J/m, 80 J/m to about 125 J/m, 80 J/m to about 100 J/m, 85 J/m to about 200 J/m, 85 J/m to about 175 J/m, 85 J/m to about 150 J/m, 85 J/m to about 125 J/m, 85 J/m to about 100 J/m, 90 J/m to about 200 J/m, 90 J/m to about 175 J/m, 90 J/m to about 150 J/m, or 90 J/m to about 125 J/m. In a further aspect, the fiber reinforced thermoplastic composite exhibits a notched Izod impact strength of about 70 J/m to about 200 J/m. In a still further aspect, the fiber reinforced thermoplastic composite exhibits a notched Izod impact strength of about 80 J/m to about 200 J/m. In a yet further aspect, the fiber reinforced thermoplastic composite exhibits a notched Izod impact strength of about 85 J/m to about 200 J/m.

In one aspect, the fiber reinforced thermoplastic composite exhibits a unnotched Izod impact strength of at least about 500 J/m, about 550 J/m, about 600 J/m, about 650 J/m, or about 700 J/m. In a further aspect, the fiber reinforced thermoplastic composite exhibits a unnotched Izod impact strength of at least about 500 J/m, about 510 J/m, about 520 J/m, about 530 J/m, about 540 J/m, about 550 J/m, about 560 J/m, about 570 J/m, about 580 J/m, about 590 J/m, or about 600 J/m. In a still further aspect, the fiber reinforced thermoplastic composite exhibits a unnotched Izod impact strength of at least about 600 J/m, about 610 J/m, about 620 J/m, about 630 J/m, about 640 J/m, about 650 J/m, about 660 J/m, about 670 J/m, about 680 J/m, about 690 J/m, or about 700 J/m. In an even further aspect, the fiber reinforced thermoplastic composite can exhibit a unnotched Izod impact strength of at least about 500 J/m. In a still further aspect, the fiber reinforced thermoplastic composite can exhibit a unnotched Izod impact strength of at least about 510 J/m. In a yet further aspect, the fiber reinforced thermoplastic composite can exhibit a notched Izod impact strength of at least about 520 J/m. In an even further aspect, the fiber reinforced thermoplastic composite can exhibit a unnotched Izod impact strength of at least about 530 J/m. In a still further aspect, the fiber reinforced thermoplastic composite can exhibit an unnotched Izod impact strength of at least about 540 J/m. In a yet further aspect, the fiber reinforced thermoplastic composite can exhibit an unnotched Izod impact strength of at least about 550 J/m. In an even further aspect, the fiber reinforced thermoplastic composite can exhibit an unnotched Izod impact strength of at least about 600 J/m. It is understood that unnotched Izod impact strength ("UII") of the disclosed composites is measured in accordance with ASTM D-256 on 3.2 mm thick unnotched molded test bars at 23° C.

In one aspect, the fiber reinforced thermoplastic composite exhibits a unnotched Izod impact strength of about 500 J/m to about 1000 J/m, 500 J/m to about 900 J/m, 500 J/m to about 800 J/m, 500 J/m to about 700 J/m, 500 J/m to about 600 J/m, 550 J/m to about 1000 J/m, 550 J/m to about 900 J/m, 550 J/m to about 800 J/m, 550 J/m to about 700 J/m, 550 J/m to about 600 J/m, 600 J/m to about 1000 J/m, 600 J/m to about 900 J/m, 600 J/m to about 800 J/m, 600 J/m to about 700 J/m, 650 J/m to about 1000 J/m, 650 J/m to about 900 J/m, 650 J/m to about 800 J/m, or 650 J/m to about 700 J/m. In a further aspect, the fiber reinforced thermoplastic composite exhibits a unnotched Izod impact strength of about 500 J/m to about 1000 J/m. In a still further aspect, the fiber reinforced thermoplastic composite exhibits a unnotched Izod impact strength of about 550 J/m to about 1000 J/m. In a yet further aspect, the fiber reinforced thermoplastic composite exhibits a unnotched Izod impact strength of about 600 J/m to about 1000 J/m.

In one aspect, the composite can exhibit a heat release profile, as measured according to the Ohio State University ("OSU") Heat Release test. In a further aspect, it can be characterized by a 2 minute total heat release less than about 40, about 45, about 50, about 55, about 60 or about 65 kW min/m$^2$ and a peak heat release rate less than about 40, about 45, about 50, about 55, about 60 or about 65 kW/m$^2$. In a still further aspect, the composite is characterized by a 2 minute total heat release less than 40 kW min/m$^2$ and a peak heat release rate less than 40 kW/m$^2$. In a still further aspect, the composite is characterized by a 2 minute total heat release less than 65 kW min/m$^2$ and a peak heat release rate less than 65 kW/m$^2$.

In one aspect, the composite further exhibits a melt mass-flow rate ("MFR") of at least about 40 g/10 min, about 42 g/10 min, about 44 g/10 min, about 46 g/10 min, about 48 g/10 min, about 50 g/10 min, about 52 g/10 min, about 54 g/10 min, about 56 g/10 min, about 58 g/10 min, about 60 g/10 min, about 62 g/10 min, about 64 g/10 min, about 66 g/10 min, about 68 g/10 min, about 70 g/10 min, about 72 g/10 min, about 74 g/10 min, about 76 g/10 min, about 78 g/10 min, about 80 g/10 min, about 82 g/10 min, about 84 g/10 min, about 86 g/10 min, about 88 g/10 min, about 90 g/10 min, about 95 g/10 min, about 100 g/10 min, or about 105 g/10 min when determined under the conditions of 380° C. and 6.6 kg mass in accordance with ASTM D1238. It is understood that the MFR is determined in accordance with ASTM 1238 at the temperature and using the mass as specified.

In one aspect, the composite further exhibits a melt mass-flow rate ("MFR") of at least about 40 g/10 min when determined under the conditions of 380° C. and 6.6 kg mass in accordance with ASTM D1238. In a still further aspect, the composite further exhibits a melt mass-flow rate ("MFR") of at least about 50 g/10 min when determined under the conditions of 380° C. and 6.6 kg mass in accordance with ASTM D1238. In a yet further aspect, the composite further exhibits a melt mass-flow rate ("MFR") of at least about 60 g/10 min when determined under the conditions of 380° C. and 6.6 kg mass in accordance with ASTM D1238. In an even further aspect, the composite further exhibits a melt mass-flow rate ("MFR") of at least about 62 g/10 min when determined under the conditions of 380° C. and 6.6 kg mass in accordance with ASTM D1238. In a still further aspect, the composite further exhibits a melt mass-flow rate ("MFR") of at least about 64 g/10 min when determined under the conditions of 380° C. and 6.6 kg mass in accordance with ASTM D1238. In a yet further aspect, the composite further exhibits a melt mass-flow rate ("MFR") of at least about 66 g/10 min when determined under the conditions of 380° C. and 6.6 kg mass in accordance with ASTM D1238. In an even further aspect, the composite further exhibits a melt mass-flow rate ("MFR") of at least about 68 g/10 min when determined under the conditions of 380° C. and 6.6 kg mass in accordance with ASTM D1238. In a still further aspect, the composite further exhibits a melt mass-flow rate ("MFR") of at least about 70 g/10 min when determined under the conditions of 380° C. and 6.6 kg mass in accordance with ASTM D1238.

In one aspect, the composite further exhibits a melt mass-flow rate ("MFR") of from about 40 g/10 min to 150 g/10 min when determined under the conditions of 380° C. and 6.6 kg mass in accordance with ASTM D1238. In a further aspect, the composite further exhibits a melt mass-flow rate ("MFR") of from about 50 g/10 min to 100 g/10 min when determined under the conditions of 380° C. and 6.6 kg mass in accordance with ASTM D1238. In a still further aspect, the composite further exhibits a melt mass-flow rate ("MFR") of from about 60 g/10 min to 90 g/10 min when determined under the conditions of 380° C. and 6.6 kg mass in accordance with ASTM D1238.

In a further aspect, the fiber reinforced thermoplastic composites comprises 30% carbon fiber, 52% ULTEM™ 1040A, 14% PEEK 90P, and 4% polyetherimide-siloxane copolymer Siltem™ D-9000.

C. Thermoplastic Polymer Phase

In one aspect, the thermoplastic polymer phase comprises a thermoplastic resin, a flow modifier, and a polyetherimide-siloxane copolymer. The thermoplastic resin can comprises one or more thermoplastic polymer resins including, but are not limited to, polyphenylene sulfides and polyimides. In a further aspect, the polyimides used in the disclosed composites include polyamideimides, polyetherimides and polybenzimidazoles. In a further aspect, polyetherimides comprise melt processable polyetherimides.

Suitable polyetherimides that can be used in the disclosed composites include, but are not limited to, ULTEM™. ULTEM™ is a polymer from the family of polyethetimides (PEI) sold by Saudi Basic Industries Corporation (SABIC). ULTEM™ can have elevated thermal resistance, high strength and stiffness, and broad chemical resistance. ULTEM™ as used herein refers to any or all ULTEM™ polymers included in the family unless otherwise specified. In a further aspect, the ULTEM™ is ULTEM™ 1040A. In one aspect, a polyetherimide can comprise any polycarbonate material or mixture of materials, for example, as recited in U.S. Pat. Nos. 4,548,997; 4,629,759; 4,816,527; 6,310,145;

and 7,230,066, all of which are hereby incorporated in its entirety for the specific purpose of disclosing various polyetherimide compositions and methods.

In certain aspects, the thermoplastic polymer is a polyetherimide polymer having a structure comprising structural units represented by a organic radical of formula (I):

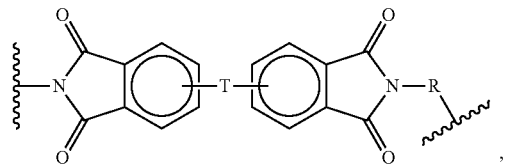
(I)

wherein R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II):

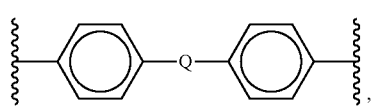
(II)

wherein Q includes a divalent moiety selected from the group consisting of —O—, —S—, —C(O)—, —SO2-, —SO—, -CyH2y- (y being an integer from 1 to 5), and halogenated derivatives thereof, including perfluoroalkylene groups; wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

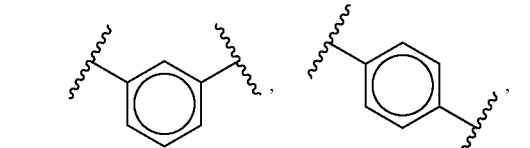

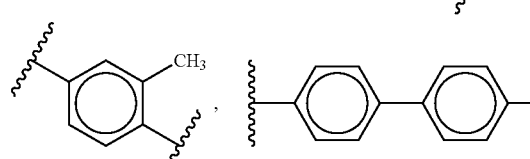

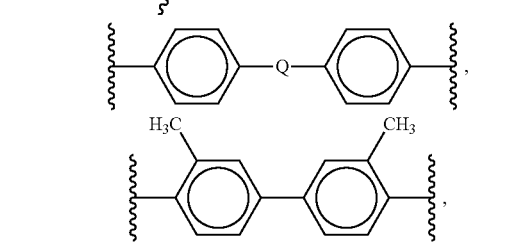

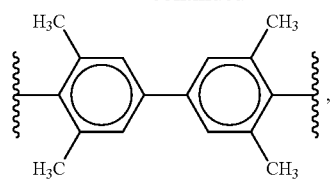
, or

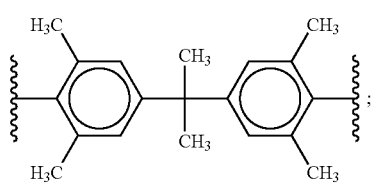
(III)
; and wherein the polyetherimides which are included by formula (I) have a Mw of less than or equal to about 40,000.

In a further aspect, the polyetherimide polymer may be a copolymer, which, in addition to the etherimide units described above, further contains polyimide structural units of the formula (IV):

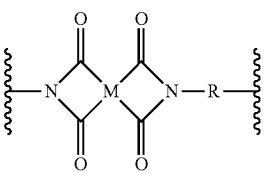
(IV)

wherein R is as previously defined for formula (I) and M includes, but is not limited to, radicals of formula (V):

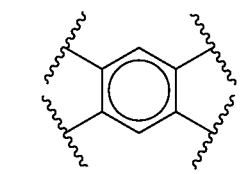

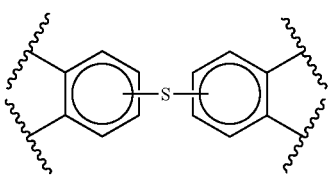
, or

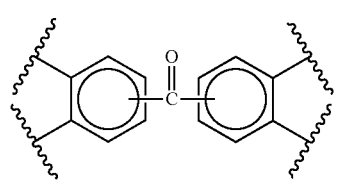
(V)

In a further aspect, the thermoplastic resin is a polyetherimide polymer having structure represented by a formula:

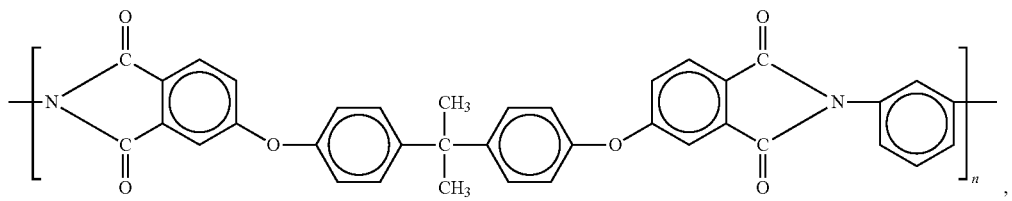

wherein the polyetherimide polymer has a molecular weight of about 15,000 Daltons, about 20,000 Daltons, about 25,000 Daltons, about 30,000 Daltons, about 35,000 Daltons, or about 39,000 Daltons.

The polyetherimide polymer can be prepared by methods known to one skilled in the art, including the reaction of an aromatic bis(ether anhydride) of the formula (VI):

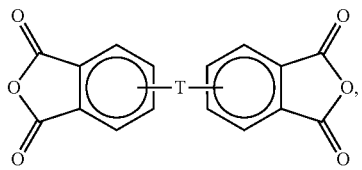

(VI)

with an organic diamine of the formula (IX):

H$_2$N—R—NH$_2$     (VII), wherein T and R are defined as described above in formula (I).

Illustrative, non-limiting examples of aromatic bis(ether anhydride)s of formula (VI) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VI) above includes, but is not limited to, compounds wherein T is of the formula (VIII):

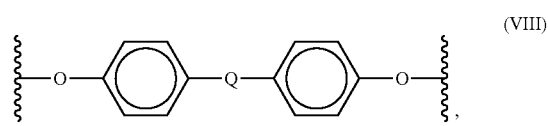

(VIII)

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Illustrative, non-limiting examples of suitable diamino compounds of formula (VII) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecane diamine, 1,18-octadecanediamine, 3-methylheptamethylenediamine, 4,4-dimethylheptamethylenediamine, 4-methylnonamethylenediamine, 5-methylnonamethylene diamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylene diamine, 1,2-bis(3-aminopropoxy) ethane, bis(3-aminopropyl) sulfide, 1,4-cyclohexane diamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl)ether, bis(p-b-methyl-o-aminophenyl)benzene, bis(p-b-methyl-o-aminopentyl)benzene, 1,3-diamino-4-isopropyl benzene, bis(4-aminophenyl) sulfide, bis(4-aminophenyl) sulfone, bis(4-aminophenyl)ether and 1,3-bis(3-aminopropyl)tetramethyldisiloxane. Mixtures of these compounds may also be present. Beneficial diamino compounds are aromatic diamines, especially m- and p-phenylenediamine and mixtures thereof.

In a further aspect, the polyetherimide resin includes structural units according to formula (I) wherein each R is independently p-phenylene or m-phenylene or a mixture thereof and T is a divalent radical of the formula (IX):

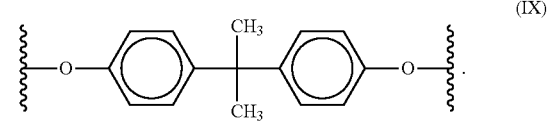

(IX)

In various aspects, the reactions can be carried out employing solvents such as o-dichlorobenzene, m-cresol/toluene, or the like, to effect a reaction between the anhydride of formula (VI) and the diamine of formula (VII), at temperatures of about 100° C. to about 250° C. Alternatively, the polyetherimide can be prepared by melt polymerization of aromatic bis(ether anhydride)s of formula (VI) and diamines of formula (VII) by heating a mixture of the starting materials to elevated temperatures with concurrent stirring. Melt polymerizations can employ temperatures of about 200° C. to about 400° C. Chain stoppers and branching agents can also be employed in the reaction. The polyetherimide polymers can optionally be prepared from reaction of an aromatic bis(ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram ($\mu$eq/g) acid titratable groups in one embodiment, and less than about 10 $\mu$eq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

In one aspect, the polyetherimide has a Mw of greater than or equal to about 15,000 Daltons, about 20,000 Daltons, about 25,000 Daltons, or about 30,000 Daltons. In a further aspect, the polyetherimide has a Mw of greater than or equal to about 15,000 Daltons. In a still further aspect, the polyetherimide has a Mw of greater than or equal to about 20,000 Daltons. In a yet further aspect, the polyetherimide has a Mw of greater than or equal to about 25,000 Daltons. In an even further aspect, the polyetherimide has a Mw of greater than or equal to about 30,000 Daltons. It is understood that the Mw of the thermoplastic resin is as measured by gel permeation chromatography, using a polystyrene standard.

In one aspect, the polyetherimide has a Mw less than or equal to about 40,000 Daltons, about 39,000 Daltons, about 38,000 Daltons, about 37,000 Daltons, about 36,000 Daltons, about 35,000 Daltons, about 34,000 Daltons, about 33,000 Daltons, about 32,000 Daltons, about 31,000 Daltons, or about 30,000 Daltons. In a further aspect, the polyetherimide has a Mw less than or equal to about 40,000 Daltons. In a further aspect, the polyetherimide has a Mw less than or equal to about 39,000 Daltons. In a still further aspect, the polyetherimide has a Mw less than or equal to about 35,000 Daltons.

In one aspect, the polyetherimide has a Mw from about 10,000 Daltons to about 40,000 Daltons, from about 15,000 Daltons to about 40,000 Daltons, from about 17,000 Daltons to about 40,000 Daltons, from about 19,000 Daltons to about 40,000 Daltons, from about 20,000 Daltons to about 40,000 Daltons, from about 21,000 Daltons to about 40,000 Daltons, from about 22,000 Daltons to about 40,000 Daltons, from about 23,000 Daltons to about 40,000 Daltons, from about 24,000 Daltons to about 40,000 Daltons, or from about 25,000 Daltons to about 40,000 Daltons. In a further aspect, the polyetherimide has a Mw from about 10,000 Daltons to about 39,000 Daltons, from about 15,000 Daltons to about 39,000 Daltons, from about 17,000 Daltons to about 39,000 Daltons, from about 19,000 Daltons to about 39,000 Daltons, from about 20,000 Daltons to about 39,000 Daltons, from about 21,000 Daltons to about 39,000 Daltons, from about 22,000 Daltons to about 39,000 Daltons, from about 23,000 Daltons to about 39,000 Daltons, from about 24,000 Daltons to about 39,000 Daltons, or from about 25,000 Daltons to about 39,000 Daltons. In a still further aspect, the polyetherimide has a Mw from about 10,000 Daltons to about 35,000 Daltons, from about 15,000 Daltons to about 35,000 Daltons, from about 17,000 Daltons to about 35,000 Daltons, from about 19,000 Daltons to about 35,000 Daltons, from about 20,000 Daltons to about 35,000 Daltons, from about 21,000 Daltons to about 35,000 Daltons, from about 22,000 Daltons to about 35,000 Daltons, from about 23,000 Daltons to about 35,000 Daltons, from about 24,000 Daltons to about 35,000 Daltons, or from about 25,000 Daltons to about 35,000 Daltons. In a yet further aspect, the polyetherimide has a Mw from about 15,000 Daltons to about 40,000 Daltons. In an even further aspect, the polyetherimide has a Mw from about 15,000 Daltons to about 39,000 Daltons. In a still further aspect, the polyetherimide has a Mw from about 20,000 Daltons to about 35,000 Daltons. In a yet further aspect, the polyetherimide has a Mw from about 25,000 Daltons to about 35,000 Daltons.

D. Flow Modifier

In one aspect, the fiber reinforced thermoplastic composite can comprise a flow modifier. In a further aspect, the flow modifier can be a polymer. In a still further aspect, the flow modifier is a polyetherketone ("PEK"), a polyaryletherketone ("PAEK"), or a polyetheretherketone ("PEEK"). In a yet further aspect, the flow modifier is a PEEK. For example, a PEEK useful as a flow modifier in the disclosed composites is Victrex PEEK 90P. Victrex PEEK 90P is a patented product sold by Victrex plc and described in U.S. Pat. No. 7,906,574, which is incorporated in its entirety for the specific purpose of disclosing various PEEK compositions and methods. It is a semicrystalline polymer having a melt viscosity of 90 pa·s when determined under the conditions of 400° C. and a shear rate of 1000/s.

In one aspect, the flow modifier can have a melt viscosity less than about 75, about 80, about 90, about 100, about 125, or about 150. In a further aspect, the flow modifier has a melt viscosity less than about 90, about 100, about 125 or about 150 Pa-s. In a yet further aspect, the flow modifier has a melt viscosity less than about 150 Pa-s. In an even further aspect, the flow modifier has a melt viscosity less than about 100 Pa-s. In a still further aspect, the flow modifier has a melt viscosity less than about 90 Pa-s. The Pa-s values are determined at a shear rate of 1000/s.

E. Polyetherimide-siloxane Copolymer

Various types of polyetherimide-siloxane copolymers can be employed. The polyetherimide-siloxane copolymer can be a polyetherimide-siloxane random copolymer with from 10 to 50 percent by weight siloxane. The polyetherimide-siloxane copolymer can be a polyetherimide-siloxane random copolymer with 10-35 percent by weight siloxane. The polyetherimide-siloxane copolymer can be a polyetherimide-siloxane block copolymer with 15-30% dimethyl siloxane with a block length from 10 to 40 dimethyl siloxane units.

The block length of a siloxane segment of the polyetherimide-siloxane copolymer can be of any effective length. In some examples it can be of 2-50 siloxane repeating units. In other instances the siloxane block length it can be from 5-30 repeat units. In many instances dimethyl siloxanes can be used.

Examples of such siloxane polyetherimides are shown in U.S. Pat. Nos. 4,404,350, 4,808,686 and 4,690,997. In one instance polyetherimide siloxanes can be prepared in a manner similar to that used for polyetherimides, except that a portion, or all, of the organic diamine reactant is replaced by an amine-terminated organo siloxane, for example of the Formula X wherein g is an integer from 1 to about 50, preferably from about 5 to about 30 and R' is an aryl, alkyl or aryl alky group of from 2 to 20 carbon atoms.

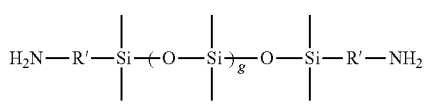
(Formula X)

The polyetherimide-siloxane copolymer can be prepared by any of the methods well known to those skilled in the art, including the reaction of an aromatic bis(ether anhydride) of the formula (XI):

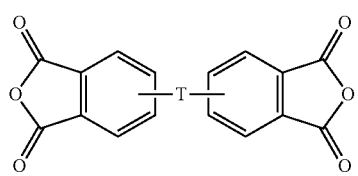
(Formula XI)

wherein T is —O—, —S—, —SO$_2$— or a group of the formula —O—Z—O— wherein the divalent bonds of the —O— or the —O—Z—O— group are in the 3,3', 3,4', 4,3', or the 4,4' positions, and wherein Z includes, but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XII):

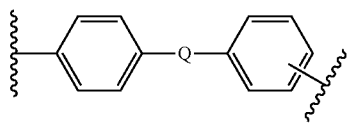
(Formula XII)

wherein Q includes but is not limited to a divalent moiety selected from the group consisting of —O—, —S—, —C(O)—, —SO$_2$—, —SO—, —C$_y$H$_{2y}$—(y being an integer from 1 to 8), and fluorinated derivatives thereof, including perfluoroalkylene groups, with an organic diamine of the formula (IV):

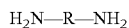   (Formula XIII)

wherein the moiety R in formula (XIII) includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XII).

Examples of specific aromatic bis anhydrides and organic diamines are disclosed, for example, in U.S. Pat. Nos. 3,972,902 and 4,455,410. Illustrative examples of aromatic bis anhydride of formula (II) include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis(amino-t-butyl) toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) sulfone, bis(4-aminophenyl)ether and 1,3-bis(3-aminopropyl)tetramethyldisiloxane. Mixtures of these compounds may also be present. The preferred diamino compounds are aromatic diamines, especially m- and p-phenylenediamine, sulfonyl dianiline and mixtures thereof.

Some polyetherimide-siloxane copolymers can be formed by reaction of an organic diamine, or mixture of diamines, of formula (XIII) and the amine-terminated organo siloxane of X. The diamino components can be physically mixed prior to reaction with the bis-anhydride(s), thus forming a substantially random copolymer. Alternatively block or alternating copolymers can be formed by selective reaction of formulas (XIII) and (X) with dianhydrides, for example those of formula XI, to make polyimide blocks that are subsequently reacted together. In another instance the siloxane used to prepare the polyetherimde copolymer may have anhydride rather than amine functional end groups.

In various aspects, the siloxane polyetherimide copolymer can be of formula (XIV) wherein T, R' and g are described as above, n is from 5-100 and Ar is an aryl or alkyl aryl group of from 6 to 36 carbons.

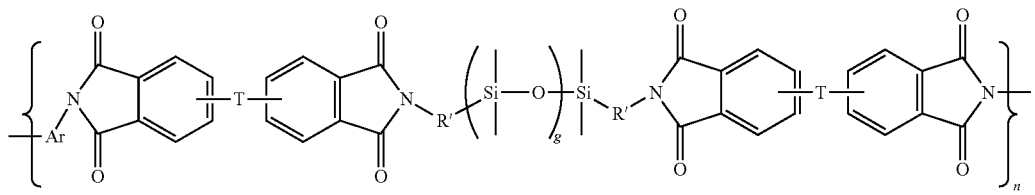

(Formula XIV)

In various aspects, the diamine component of the siloxane polyetherimide copolymers may contain from about 20 to 50 mole % of the amine-terminated organo siloxane of formula I and from about 50 to 80 mole % of the organic diamine of formula IV. In some siloxane copolymers, the siloxane component is derived from about 25 to about 40 mole % of an amine or anhydride terminated organo siloxane, for example as described in U.S. Pat. No. 4,404,350.

In one aspect, the fiber reinforced thermoplastic composite can comprise a polyetherimide-siloxane copolymer present in an amount of at least about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.2 wt %, about 2.4 wt %, about 2.6 wt %, about 2.8 wt %, about 3.0 wt %, about 3.5 wt %, about 4.0 wt %, about 5.0 wt %, about 5.5 wt %, about 6.0 wt %, about 7.0 wt %, about 8.0 wt %, about 9.0 wt %, about 10.0 wt %, about 11.0 wt %, about 12.0 wt %, about 13.0 wt %, or about 14.0 wt %. In a further aspect, the fiber reinforced thermoplastic composite can comprise a polyetherimide-siloxane copolymer present in an amount of at least about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.2 wt %, about 2.4 wt %, about 2.6 wt %, about 2.8 wt %, or about 3.0 wt %. In a still further aspect, the fiber reinforced thermoplastic composite can comprise a polyetherimide-siloxane copolymer present in an amount of at least about 1.0 wt %. In a still further aspect, the fiber reinforced thermoplastic composite can comprise a polyetherimide-siloxane copolymer present in an amount of at least about 2.0 wt %. In a still further aspect, the fiber reinforced thermoplastic composite can comprise a polyetherimide-siloxane copolymer present in an amount of at least about 3.0 wt %.

In a further aspect, the fiber reinforced thermoplastic composite can comprise a polyetherimide-siloxane copolymer present in an amount from about 1 wt % to about 15 wt %, from about 1 wt % to about 14 wt %, from about 1 wt % to about 13 wt %, from about 1 wt % to about 12 wt %, from about 1 wt % to about 11 wt %, from about 1 wt % to about 10 wt %, from about 1 wt % to about 9 wt %, from about 1 wt % to about 8 wt %, from about 1 wt % to about 7 wt %, from about 1 wt % to about 6 wt %, from about 1 wt % to about 5 wt %, from about 2 wt % to about 15 wt %, from about 2 wt % to about 14 wt %, from about 2 wt % to about 13 wt %, from about 2 wt % to about 12 wt %, from about 2 wt % to about 11 wt %, from about 2 wt % to about 10 wt %, from about 2 wt % to about 9 wt %, from about 2 wt % to about 8 wt %, from about 2 wt % to about 7 wt %, from about 2 wt % to about 6 wt %, from about 2 wt % to about 5 wt %, from about 3 wt % to about 15 wt %, from about 3 wt % to about 14 wt %, from about 3 wt % to about 13 wt %, from about 3 wt % to about 12 wt %, from about 3 wt % to about 11 wt %, from about 3 wt % to about 10 wt %, from about 3 wt % to about 9 wt %, from about 3 wt % to about 8 wt %, from about 3 wt % to about 7 wt %, from about 3 wt % to about 6 wt %, or from about 3 wt % to about 5 wt %. In a still further aspect, the fiber reinforced thermoplastic composite can comprise a polyetherimide-siloxane copolymer present in an amount from about 1 wt % to about 15 wt %, from about 2 wt % to about 8 wt %, or from about 3 wt % to about 5 wt %. In a yet further aspect, the fiber reinforced thermoplastic composite can comprise a polyetherimide-siloxane copolymer present in an amount from about 1 wt % to about 15 wt %. In an even further aspect, the fiber reinforced thermoplastic composite can comprise a polyetherimide-siloxane copolymer present in an amount from about 2 wt % to about 8 wt %. In a still further aspect, the fiber reinforced thermoplastic composite can comprise a polyetherimide-siloxane copolymer present in an amount from about 3 wt % to about 5 wt %.

F. Carbon Fibers

The carbon fibers suitable for use in the manufacture of the disclosed composites carbon fibers having a tensile strength in the range of from about 500 kilopounds per square inch ("KSI") to about 1,200 KSI. For example, the intermediate modulus (IM) carbon fibers can be polyacrylonitrile ("PAN") based carbon fibers. PAN-based carbon fibers typically exhibit a tensile strength value of about 500 to about 1000 KSI. For example, a PAN based carbon fiber can have a tensile strength of about 822 KSI. In various aspects, the carbon fibers can be selected from standard modulus, intermediate modulus, and high modulus carbon fibers provided that the carbon fibers have a tensile strength of from about 500 kilopounds per square inch ("KSI") to about 1,200 KSI.

In one aspect, the intermediate modulus fibers suitable for use in the manufacture of the disclosed composites have a tensile strength in the range of from about 600 KSI to about 1,200 MSI. In a further aspect, the intermediate modulus fibers suitable for use in the manufacture of the disclosed composites have a tensile strength in the range of from about 700 KSI to about 1,200 MSI. In a still further aspect, the intermediate modulus fibers suitable for use in the manufacture of the disclosed composites have a tensile strength in the range of from about 800 KSI to about 1,200 MSI.

In various aspects, the carbon fibers suitable for use in the manufacture of the disclosed composites have a tensile strength greater than or equal to about 400 KSI, about 450 KSI, about 500 KSI; about 550 KSI, about 600 KSI, about 650 KSI, about 700 KSI, about 750 KSI, about 800 KSI, about 850 KSI, or about 900 KSI. In a further aspect, the carbon fibers suitable for use in the manufacture of the disclosed composites have a tensile strength greater than or equal to about 700 KSI, about 710 KSI, about 720 KSI, about 730 KSI, about 740 KSI, about 750 KSI, about 760 KSI, about 770 KSI, about 780 KSI, about 790 KSI, about 800 KSI, about 810 KSI, about 820 KSI, about 830 KSI, about 840 KSI, about 850 KSI, about 860 KSI, about 870 KSI, about 880 KSI, about 890 KSI, or about 900 KSI. In a still further aspect, the carbon fibers suitable for use in the manufacture of the disclosed composites have a tensile strength greater than or equal to about 400

KSI. In a yet further aspect, the carbon fibers suitable for use in the manufacture of the disclosed composites have a tensile strength greater than or equal to about 500 KSI. In an even further aspect, the carbon fibers suitable for use in the manufacture of the disclosed composites have a tensile strength greater than or equal to about 600 KSI. In a still further aspect, the carbon fibers suitable for use in the manufacture of the disclosed composites have a tensile strength greater than or equal to about 700 KSI. In a yet further aspect, the carbon fibers suitable for use in the manufacture of the disclosed composites have a tensile strength greater than or equal to about 800 KSI. In an even further aspect, the carbon fibers suitable for use in the manufacture of the disclosed composites have a tensile strength greater than or equal to about 810 KSI. In a still further aspect, the carbon fibers suitable for use in the manufacture of the disclosed composites have a tensile strength greater than or equal to about 820 KSI. In a yet further aspect, the carbon fibers suitable for use in the manufacture of the disclosed composites have a tensile strength greater than or equal to about 830 KSI. In an even further aspect, the carbon fibers suitable for use in the manufacture of the disclosed composites have a tensile strength greater than or equal to about 840 KSI. In a still further aspect, the carbon fibers suitable for use in the manufacture of the disclosed composites have a tensile strength greater than or equal to about 850 KSI.

In various aspects, the high strength carbon fibers suitable for use in the manufacture of the disclosed composites have a tensile strength greater than or equal to about 400 KSI, about 450 KSI, about 500 KSI, about 550 KSI, about 600 KSI, about 650 KSI, about 700 KSI, about 750 KSI, about 800 KSI, about 850 KSI, or about 900 KSI. In a further aspect, the high strength carbon fibers suitable for use in the manufacture of the disclosed composites have a tensile strength greater than or equal to about 700 KSI, about 710 KSI, about 720 KSI, about 730 KSI, about 740 KSI, about 750 KSI, about 760 KSI, about 770 KSI, about 780 KSI, about 790 KSI, about 800 KSI, about 810 KSI, about 820 KSI, about 830 KSI, about 840 KSI, about 850 KSI, about 860 KSI, about 870 KSI, about 880 KSI, about 890 KSI, or about 900 KSI. In a still further aspect, the high strength carbon fibers suitable for use in the manufacture of the disclosed composites have a tensile strength greater than or equal to about 400 KSI. In a yet further aspect, the high strength carbon fibers suitable for use in the manufacture of the disclosed composites have a tensile strength greater than or equal to about 500 KSI. In an even further aspect, the high strength carbon fibers suitable for use in the manufacture of the disclosed composites have a tensile strength greater than or equal to about 600 KSI. In a still further aspect, the high strength carbon fibers suitable for use in the manufacture of the disclosed composites have a tensile strength greater than or equal to about 700 KSI. In a yet further aspect, the high strength carbon fibers suitable for use in the manufacture of the disclosed composites have a tensile strength greater than or equal to about 800 KSI. In an even further aspect, the high strength carbon fibers suitable for use in the manufacture of the disclosed composites have a tensile strength greater than or equal to about 810 KSI. In a still further aspect, the high strength carbon fibers suitable for use in the manufacture of the disclosed composites have a tensile strength greater than or equal to about 820 KSI. In a yet further aspect, the high strength carbon fibers suitable for use in the manufacture of the disclosed composites have a tensile strength greater than or equal to about 830 KSI. In an even further aspect, the high strength carbon fibers suitable for use in the manufacture of the disclosed composites have a tensile strength greater than or equal to about 840 KSI. In a still further aspect, the high strength carbon fibers suitable for use in the manufacture of the disclosed composites have a tensile strength greater than or equal to about 850 KSI.

As one of ordinary skill in the art will appreciate, most commercially available carbon fibers are typically produced either through controlled pyrolysis of polyacrylonitrile fibers, also known as PAN fibers or by carbonizing the pitch fibers that are spun from the liquid crystal state of commercial pitch. Pitch based carbon fibers typically exhibit low tensile strength (300-450 KSI) when compared to the PAN based carbon fiber (500-1000 KSI or higher) which can be attributed partly to the difficulties of spinning liquid crystalline pitch. The carbon fibers suitable for use in the manufacture of the disclosed composites will be predominantly PAN based carbon fibers due to their higher tensile strength.

Non-limiting examples of commercially available high strength carbon fibers include HexTow® IM7, commercially available from the Hexcel Corporation, and having a tensile strength of about 822 KSI and TORAYCA® T800S, commercially available from Toray Carbon Fibers America, Inc., (a wholly owned subsidiary of Toray Industries, Inc.) and having a tensile modulus of about 850 KSI.

G. Methods

Also disclosed herein are methods for the manufacturer of composites, such as fiber reinforced thermoplastic composites. In one aspect, the methods can manufacturer the fiber reinforced thermoplastic composites described elsewhere herein.

Also disclosed are methods for the manufacture of a fiber-reinforced thermoplastic composition, comprising the steps of: a) providing thermoplastic resin composition comprising: i) a thermoplastic resin having a molecular weight of less than or equal to about 40,000 Daltons; ii) a flow modifier; and iii) a polyetherimide-siloxane copolymer; b) introducing a plurality of carbon fibers having a tensile strength in the range of from about 500 to about 1,200 kilo-pounds per square inch ("KSI") dispersed within the continuous thermoplastic polymer phase to form a fiber reinforced thermoplastic composite precursor composition; and c) forming a fiber reinforced thermoplastic composite from the precursor composition; and wherein the formed fiber reinforced thermoplastic composite exhibits a tensile strength of at least about 240 MPa; wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; and wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

In one aspect, one or more steps on the method can be carried out in an extruder, such as a twin screw extruder, such as a ZSK 40 mm twin screw extruder. In one aspect, the thermoplastic resin and flow modifier can be added to the feed throat of the extruder. The carbon fibers can be added at a later stage of the process or down stream from the feed throat.

In one aspect, the barrel temperature of the extruder can be between about 300° C. and about 400° C., for example between about 360° C. and about 370° C.

In one aspect, the mold temperature can be about 120° C., about 140° C., about 160° C., about 180° C., or about 200° C. For example, the mold temperature can be about 160° C.

In various aspects, the fiber reinforced thermoplastic composites disclosed herein can be converted to articles using common thermoplastic processes such as film and sheet extrusion, Film and sheet extrusion processes can include and are not limited to melt casting, blown film extrusion and calendering. Co-extrusion and lamination processes can be employed to form composite multi-layer films or sheets. Single or multiple layers of coatings can further be applied to the single or multi-layer substrates to impart additional properties such as scratch resistance, ultra violet light resistance, aesthetic appeal, etc. Coatings can be applied through standard application techniques such as rolling, spraying, dipping, brushing, or flow coating. Film and sheet can alternatively be prepared by casting a solution or suspension of the composition in a suitable solvent onto a substrate, belt or roll followed by removal of the solvent. Films can also be metallized using standard processes such as sputtering, vacuum deposition and lamination with foil.

Oriented films can be prepared through blown film extrusion or by stretching cast or calendered films in the vicinity of the thermal deformation temperature using conventional stretching techniques. For instance, a radial stretching pantograph can be employed for multi-axial simultaneous stretching; an x-y direction stretching pantograph an be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

In various aspects, the fiber reinforced thermoplastic composites disclosed herein can be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above can further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: 1) Providing a single or multi-layer thermoplastic substrate having optionally one or more colors on the surface, for instance, using screen printing of a transfer dye; 2) Conforming the substrate to a mold configuration such as by forming and trimming a substrate into a three dimensional shape and fitting the substrate into a mold having a surface which matches the three dimensional shape of the substrate; and 3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

H. Articles of Manufacturer

Also disclosed herein are articles of manufacturer comprising the fiber reinforced thermoplastic composites described herein.

In one aspect, the articles of manufacturer include, but are not limited to parts in aircraft. The fiber reinforced thermoplastic composites can replace metal used in aircraft. Suitable airplane parts include, but are not limited to aircraft food tray arm, armrest, seat back frame, spreader, handles on cabinets, sinks, or storage units.

In various aspects, the invention pertains to articles comprising the disclosed fiber reinforced thermoplastic composites. In a further aspect, the article can be a shaped article. In a still further aspect, the article can be a molded article. In a yet further aspect, the article can be at least one selected from cookware, food service items, medical devices, trays, plates, handles, helmets, animal cages, electrical connectors, enclosures for electrical equipment, engine parts, automotive engine parts, lighting sockets, lighting reflectors, electric motor parts, power distribution equipment, communication equipment, computers, devices having molded snap fit connectors, sheets, films, multilayer sheets, multilayer films, molded parts, extruded profiles, coated parts, fibers, foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment, and instrument panels. In a still further aspect, the article can be at least one selected from stow bin, luggage rack, parcel shelf, package tray, headliner, door module, panel, room or space partition, skin and skirt, instrument panel topper, sidewalls, ceiling and flooring panels or tiles, cargo liner, support or pillar elements or trim materials, sunshade, trays and covers, noise and vibration shields and pads, wear pads, running boards, underbody panels, seat bases or backings, plates, shields, wheel covers and wheel wells or a facesheet or fascia material, and the like. The article can be a component of a conveyance selected from the group consisting of aircraft, trains, buses, ships, and automobiles.

I. Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The materials shown in Table 1 were used to prepare the composites described herein.

TABLE 1

| Abbreviation | Description | Source |
|---|---|---|
| PEI-1 | Ultem 1000; a polyetherimide resin prepared by a condensation reaction with a Mw of about 54,000 Da. The MFR of Ultem 1000 is 9 g/10 min when determined under the conditions of 337° C. and 6.6 Kg mass. | SABIC Innovative Plastics ("SABIC IP") |
| PEI-2 | Ultem 1040A; a polyetherimide prepared by a condensation reaction with a Mw of about 31,000 Da. The MFR of Ultem 1040A is 66.5 g/10 min when determined under the conditions of 337° C. and 6.6 Kg mass. | SABIC-IP |
| PEI-SiO | Siltem D9000; a polyetherimide-siloxane random block copolymer prepared by a condensation reaction. It contains 34% siloxane. | SABIC-IP |
| PEEK | Victrex PEEK 90P; a polyetheretherketone polymer prepared by a step growth polymerization reaction with a melt viscosity of about 90 Pa-s when determined under the conditions of 400° C. and a shear rate of 1000/s. | Victrex USA, Inc. |
| CF | HexTow IM7 intermediate modulus chopped carbon fiber of ~6 mm cut length having a tensile modulus of 40 MSI and a tensile strength of 822 KSI. | Hexcel Corporation |

1. Composite Batches

Representative composite compositions were prepared using the reactants as shown in Table 2 using materials described in Table 1. The values given under each batch are the amount of each item in pounds that was used in the indicated batch in wt % of the whole composition.

TABLE 2

| | | Batch* | | |
|---|---|---|---|---|
| # | Item | 1 | 2 | 3 |
| 1 | PEI-1 | 70 | — | — |
| 2 | PEI-2 | — | 70 | 52 |
| 3 | PEI-SiO | — | — | 4 |
| 4 | PEEK | — | — | 14 |
| 4 | CF | 30 | 30 | 30 |

*All component amounts given in as wt % of the total composition.

Table 3 shows the melt flow rate and OSU heat release test results for the three batches described in Table 2. The melt mass-flow rate ("MFR") was determined at 380° C. and 6.6 kg mass in accordance with ASTM D1238

Table 3 shows that 30 weight percent (wt %) loading of the carbon fiber in the composite with a higher Mw PEI satisfied the OSU heat release performance requirements, but the MFR was very low (10 g/10 min; see Batch 1 results). The MFR for Batch 1 suggest that a formulation of this type would be unsuitable for fabricating large articles. In contrast, Batch 2, with 30 wt % carbon fiber in PEI with a Mw of 31K, had an improved MFR, but failed to meet the requirements of the OSU heat release performance test. Surprisingly, Batch 3 which comprised 30 wt % carbon fiber in the same PEI as Batch 2, but with the addition of a polyetherimide-siloxane copolymer and a flow modifier had a exhibited both outstanding melt flow and excellent OSU heat release performance.

TABLE 3

| Material | MFR* (g/10 min) | OSU Heat Release Test (65/65) | Pass/Fail |
|---|---|---|---|
| Batch 1 | 10 | 0/52 | Pass |
| Batch 2 | 51 | 4/71 | Fail |
| Batch 3 | 69 | 5/13 | Pass |

*determined at 380° C. and 6.6 kg mass in accordance with ASTM D1238.

The various parameters in Table 3, Table 4, and referenced elsewhere herein were determined as described below. Tensile strength was measured using a Material Testing System (MTS) from Instron with a test speed: 5 mm/min and carried out in accordance with ASTM D 638. Melt flow rate (MFR) was carried out in accordance with ASTM D 1238 and measured at 380° C. and 6.6 kg mass using an extrusion plastometer from Tinius Olsen. Notched Izod Impact Strength and Unnotched Izod Impact Strength were measure using an impact tester from Tinius Olsen and carried out in accordance with ASTM D 256.

TABLE 4

| Test | Unit | Standard | PEI 1 | PEI 2 | Batch 1 | Batch 3 |
|---|---|---|---|---|---|---|
| Tensile Strength | MPa | ASTM D638 | 110 | 97 | 277 | 275 |
| Notched Izod Impact Strength | J/m | ASTM D256 | 53 | 21 | 84 | 84 |
| Unnotched Izod Impact Strength | J/m | ASTM D256 | 1335 | 470 | 598 | 597 |

Table 4 shows the tensile strength, notched Izod impact strength, and unnotched Izod impact strength of neat resins PEI 1 and PEI 2 (see Table 1 for description) compared to the batches which passed the OSU heat release performance test, i.e. Batches 1 and 3. The data in Table 4 indicates that the tensile strength of PEI 2 (a lower Mw PEI; Mw=31,000) was 12% lower than that of PEI 1 (a higher Mw PEI; Mw=54,000). Both the notched and unnotched Izod impact strength of PEI 2 was about 60% lower than those of PEI 1. Surprisingly, Batch 3, which comprised the lower Mw PEI, PEI 2, exhibited very similar tensile strength, notched Izod impact strength, and unnotched Izod impact strength to that of Batch 1, which comprised the higher Mw PEI, PEI 1. Thus, a composition comprising a low Mw PEI, a flow modifier, a polyetherimide-siloxane copolymer, and carbon fiber provided a composite material that exhibited excellent tensile strength, notched Izod impact strength, unnotched Izod impact strength, melt flow, and OSU heat release performance.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fiber reinforced thermoplastic composite, comprising a continuous thermoplastic polymer phase comprising:
   a) a polyetherimide having a molecular weight of less than or equal to about 40,000 Daltons; a polyetheretherketone having a melt viscosity less than about 150 Pascal-seconds (Pa-s) when determined under the conditions of 400° C. and a shear rate of 1000/s; and a polyetherimide-siloxane copolymer; and
   b) a dispersed phase comprising a plurality of polyacrylonitrile based carbon fibers having a tensile strength in the range of from about 500 to about 1,200 kilo-pounds per square inch ("KSI") dispersed within the continuous thermoplastic polymer phase; and
   wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

2. The composite of claim 1, wherein the polyetherimide has a molecular weight of less than or equal to about 40,000 Daltons.

3. The composite of claim 1, wherein the polyetherimide is present in an amount that does not exceed about 70 wt % of the composite.

4. The composite of claim 1, wherein the polyetherimide is present in an amount in the range of from about 40 wt % to about 60 wt % of the composite.

5. The composite of claim 1, wherein the polyetheretherketone is present in an amount in the range of from about 10 wt % to 40 wt % of the continuous thermoplastic polymer phase.

6. The composite of claim 1, wherein the polyetheretherketone has a melt viscosity less than about 100 Pascal-seconds (Pa-s) when determined under the conditions of 400° C. and a shear rate of 1000/s.

7. The composite of claim 1, wherein the plurality of carbon fibers are present in an amount that is at least about 20 wt % of the total weight of the composite.

8. The composite of claim 1, wherein the polyetherimide-siloxane copolymer is present in an amount from about 2 wt % to about 8 wt %.

9. A fiber reinforced thermoplastic composite, comprising:
   a) a continuous thermoplastic polymer phase comprising:
      i. a polyetherimide having a molecular weight of less than or equal to about 40,000 Daltons, wherein the polyetherimide resin is present in the composite in an amount that does not exceed about 70 wt % of the composite;
      ii. a polyetheretherketone having a melt viscosity less than 150 Pascal-seconds (Pa-s) when determined under the conditions of 400° C. and a shear rate of 1000/s, wherein the polyetheretherketone is present in the composite in an amount in the range of from about 10 wt % to about 40 wt % of the continuous thermoplastic polymer phase; and
      iii. a polyetherimide-siloxane copolymer, wherein the polyetherimide-siloxane copolymer is present in an amount of at least about 1 wt % of the composite; and
   b) a dispersed phase comprising a plurality of carbon fibers having a tensile strength in the range of from about 500 to about 1,200 kilo-pounds per square inch ("KSI") dispersed within the continuous thermoplastic polymer phase, wherein the plurality of carbon fibers are present in an amount that is at least about 20 wt % of the total weight of the composite.

10. The composite of claim 9, wherein the composite exhibits a notched Izod impact strength of at least about 75 J/m; wherein the composite exhibits an unnotched Izod impact strength of at least about 500 J/m; wherein the composite exhibits a melt mass-flow rate ("MFR") of at least about 40 g/10 min when determined under the conditions of 380° C. and 6.6 kg mass in accordance with ASTM D1238; wherein the composite exhibits a heat release profile characterized by a 2 minute total heat release less than about 65 kW/m$^2$ and a peak heat release rate less than about 65 kW/m$^2$ when measured according to the Ohio State University ("OSU") Heat Release test.

11. The composite of claim 1, wherein the polyetheretherketone is not a polyphenylsulfone polymer.

* * * * *